Feb. 10, 1953     C. A. BURDICK     2,627,663

MICROMETER CALIPER

Filed May 27, 1949

INVENTOR
CHARLES A. BURDICK

BY

ATTORNEYS

Patented Feb. 10, 1953

2,627,663

UNITED STATES PATENT OFFICE 2,627,663

MICROMETER CALIPER

Charles A. Burdick, Kenosha, Wis.

Application May 27, 1949, Serial No. 95,597

4 Claims. (Cl. 33—166)

This invention appertains to micrometer calipers and more particularly to a novel arrangement of scales thereon.

In all micrometers, with which I am familiar, they can only be read from one side thereof. Consequently, when the caliper is placed upon certain types of work, the scale is not visible for reading. This necessitates, the use of a mirror or reflector in back of the caliper for reading, to determine the setting without removing the caliper from the work. Obviously, this requires extra time and often a mirror cannot be quickly located.

It is, therefore, one of the primary objects of my invention to provide a micrometer caliper which can be read with equal facility from the opposite sides thereof without the use of a mirror or reflector.

Another salient object of my invention is to provide a micrometer caliper with two sets of graduations on the sleeve and thimble and with the graduations or scales, so arranged relative to one another that correct readings of the setting of the caliper can be had from either side thereof.

A further object of my invention is to provide a sliding band or sleeve on the thimble, for covering the set of numerals thereon, when the caliper is being read from another side, when said mentioned set of numerals are not being used, so as to prevent confusion in the taking of readings by the machinists using the calipers.

A still further object of the invention is to provide novel means for holding the sliding sleeve or band in correct alignment on the thimble at all times irrespective of the rotation of the thimble for setting.

With these and other objects in view, the invention consists in the novel construction, arrangement and formation of parts, as will be hereinafter more specifically described, and claimed, and illustrated in the accompanying drawing, in which drawing, Figure 1 is a front elevational view of the micrometer caliper constructed in accordance with the invention.

Referring to the drawing in detail, wherein similar reference characters designate corresponding parts throughout the several views, the letter C generally indicates a micrometer caliper having my novel arrangement of scales thereon, which will be later set forth.

Figure 1:
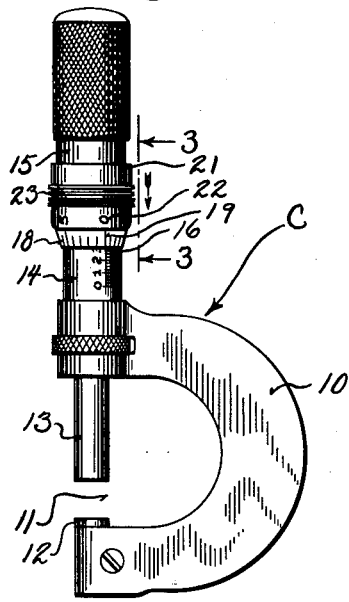

Generally, the micrometer caliper is the type now commonly found in the open market and hence includes the frame 10, having the throat 11 for receiving the work. One end of the frame carries the anvil 12, for engaging the work, at one side of the throat. Carried by the other side of the frame and movable in the throat toward or away from the anvil 12, is the spindle 13. Attached to the frame 10 is the barrel 14 and operatively connected to the spindle 13 for rotation therewith is the thimble 15. The outer end of the thimble may be knurled or roughened to facilitate the turning thereof. The spindle and the thimble travel longitudinally of the sleeve in the ordinary way and the spindle is provided with the usual number of threads per inch for traveling in a nut on the sleeve (not shown).

As heretofore brought out, my invention resides in the novel arrangement of scales for facilitating the reading of the micrometer from opposite sides thereof and the scales themselves are of the same type and character now commonly found on micrometers on the market.

Figure 3:
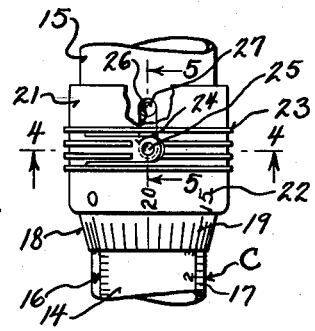
Figure 3 is an enlarged fragmentary side elevational view illustrating a portion of the sleeve and thimble and sliding sleeve of the micrometer.
Figure 4:
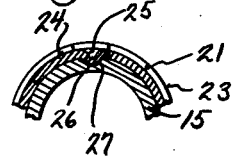
Figure 4 is a fragmentary transverse sectional view taken substantially on the line 4—4 of Figure 3, looking in the direction of the arrows illustrating the means employed for holding the sliding sleeve or band in desired alignment on the thimble.
Figure 5:
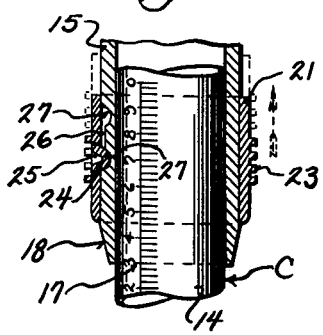
Figure 5 is a fragmentary longitudinal sectional view through the caliper taken on the line 5—5 of Figure 3, looking in the direction of the arrows, the view also showing the sliding sleeve or band and the means employed for holding the sleeve or band in correct alignment on the thimble and in its selected position thereon.

In accordance with the invention, I arrange on the barrel 14 on the front thereof, a longitudinal scale or graduations 16. On the back of the barrel I place a similar set of graduations or scale 17. The graduations of the scales 17 and 16 are identical, but it is to be noted that I prefer to arrange the scales 17 and 16 off center when the caliper is viewed from the front or rear, and hence the scales 16 and 17 are relatively close together when the micrometer caliper is viewed in side elevation (see Figure 3).

Figure 2:
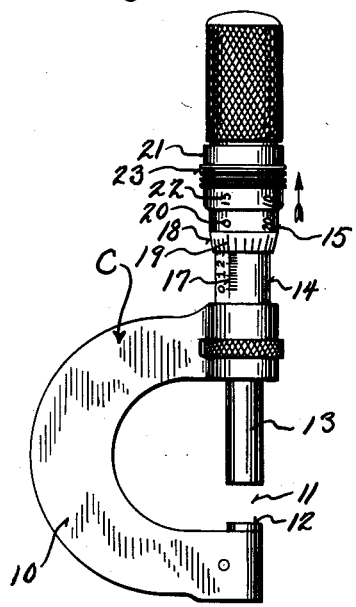
Figure 2 is a rear elevational view of the same, showing the sliding sleeve or band in its raised position for bringing into view the set of numerals, on the thimble, to permit the use thereof.

The forward edge of the thimble 15 is beveled, as at 18, as is customary and this beveled edge is provided with the usual 25 graduation lines 19, for use in conjunction with the scales 16 and 17. Every fifth line or graduation is marked 5, 10, 15, 20 and 0, as is indicated by the reference character 20. These numerals 20 are used when the micrometer caliper is being read from the back, i. e., when the back is facing the user, as is shown in Figure 2, of the drawing. To hide the reading 20 from the view of the machinist when the caliper is being read from the front (see Figure 1) I provide a sliding sleeve or band 21, on the thimble 15. The sliding sleeve or band, is movable toward and away from the beveled edge 18 of the thimble and the inner end of the band or sleeve is provided with readings 22 for cooperation with the graduations 19 on the beveled edge of the thimble. These readings 22 also are marked 5, 10, 15, 20 and 0, at equidistantly spaced points around the circumference thereof. When the sliding sleeve or band is slid down to cover the reading 20, as shown in Figure 1, then the readings 22 cooperate with the graduation marks 19. The readings 20 and 22 are so arranged relative to one another that the readings 20 will cooperate with the scale 17 and that the readings 22 will cooperate with the scale 16.

To facilitate the sliding of the sleeve or band 21 on the thimble, the same can be provided with annular finger engaging ribs 23, knurling or the like.

It is also highly desirable to hold the sliding sleeve or band 21, against turning movement on the thimble and for rotation with the thimble. This can be accomplished in various manners, but I prefer to strike out a resilient spring tongue 24, from the sliding sleeve or band. This spring tongue 24, extends circumferentially around the band, partially, and its outer end is provided with a struck in tit 25. At the end of the tongue sufficient clearance is provided for insertion of a small lever to facilitate the removing of the sliding sleeve. The thimble 15 is provided, for receiving the tit, with a longitudinally extending guideway or groove 26. Obviously, this holds the band in its desired correct alignment on the thimble. The ends of the guideway 26 can terminate in depressions or sockets 27 and when the band is at the limit of each one of its movements longitudinally of the thimble, the spring tongue snaps into a depression or socket 27, and holds the band against accidental sliding movement. The inside diameter of the sliding sleeve is slightly larger at the forward end to prevent marking or scoring the surface of the thimble which is covered when the sliding sleeve is slid forward.

Figure 6:
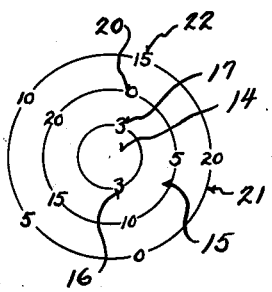
Figure 6 is a diagrammatic view, illustrating a schematic showing of the scales, the micrometer being set for one certain reading.
Figure 7:
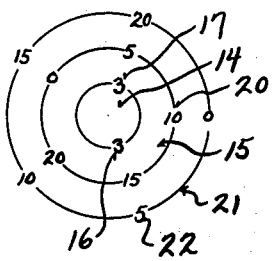
Figure 7 is a view similar to Figure 6, and showing the micrometer set for another different reading.

Now referring to the diagrammatic views of Figures 6 and 7, and more particularly to Figure 6, it will be noted that the micrometer caliper has been set for a particular reading, namely .300. The zero marking of reading 22 is in direct alignment with the numeral 3 of scale 16, while the zero reading of graduation 20 is in direct alignment with the numeral 3 of the scale 17.

In Figure 7, the micrometer has been adjusted to the reading .305 and it can be seen that the numeral 5 of reading 22 is in direct alignment with the numeral 3 of scale 16, while the number 5 of scale 20 is in direct alignment with the numeral 3 of scale 17.

Figure 8:
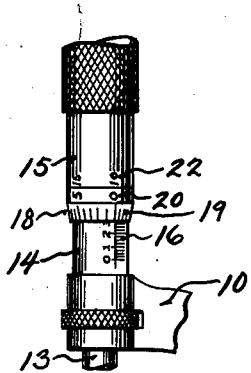
Figure 8 is a fragmentary front elevational view illustrating another form of the invention.

While the use of the sliding sleeve or band 21 is preferred, the same could be eliminated, if desired, (see Figure 8) and in this instance both scale readings 20 and 22 are marked directly on the micrometer thimble 15. In order to distinguish the two readings one from the other, a line could separate them, one reading could be marked in a distinctive color, and the numerals of one could be placed at an angle to the numerals of the other, etc.

From the foregoing description, it can be seen that I have provided novel and simple means for facilitating the reading of a micrometer from the opposite sides thereof, without the use of mirrors, reflectors and the like.

Changes in details may be made without departing from the spirit or the scope of the invention, but what I claim as new is:

1. A micrometer caliper readable from either side comprising a frame, a spindle, a sleeve, and a thimble for adjusting the spindle; scales on the front and back of the sleeve, independent sets of scale readings on the thimble for cooperation with the front and back scales, whereby the caliper can be read from the front or back, means for hiding one of the scale readings from view when the same is not in use including a sliding band forming a part of the thimble and means for holding the band against independent rotation on the thimble.

2. A micrometer caliper readable from either side comprising a frame, a spindle, a sleeve and a thimble for adjusting the spindle; scales on the front and back of the sleeve, independent sets of scale readings on the thimble for cooperation with the front and back scales, whereby the caliper can be read from the front or back, means for hiding one of the scale readings from view when the same is not in use including a sliding band forming a part of the thimble and means for holding the band against independent rotation on the thimble and in its adjusted positions.

3. A micrometer caliper readable from either side comprising a frame, a spindle, a sleeve, a thimble for adjusting the spindle, scales on the front and back of the sleeve, said thimble having graduation marks thereon and a set of readings for the graduations for use with a scale on one side of the sleeve, a band slidably mounted on the thimble for longitudinal movement thereon toward and away from the graduations and over and away from the readings for hiding said readings on the thimble when the band is in its forward position for use with the scale on the other side of the sleeve, an independent set of readings on the band for cooperation with graduations on the forward end of the thimble, and means for holding the band against independent rotation on the thimble.

4. A micrometer caliper readable from either side comprising a frame, a spindle, a sleeve, a thimble for adjusting the spindle, scales on the front and back of the sleeve, said thimble having graduation marks thereon and a set of readings for the graduations for use with a scale on one side of the sleeve, a band slidably mounted on the thimble for longitudinal movement thereon toward and away from the graduations and over and away from the readings for hiding said readings on the thimble when the band is in its forward position for use with the scale on the other side of the sleeve, an independent set of readings in the band for cooperation with graduations on the forward end of the thimble, means for holding the band against independent rotation on the thimble, including a longitudinal guideway on the thimble and a resilient tongue on the band slidably received in the guideway, said guideway having keeper sockets at its ends.

CHARLES A. BURDICK.

REFERENCES CITED

The following references are of record in the file of this patent:

UNITED STATES PATENTS

| Number | Name | Date |
|---|---|---|
| 1,254,607 | Koch | Jan. 22, 1918 |
| 1,315,318 | Maddison | Sept. 9, 1919 |
| 1,533,787 | Crescio | Apr. 14, 1925 |
| 2,520,022 | Vobeda | Aug. 22, 1950 |

FOREIGN PATENTS

| Number | Country | Date |
|---|---|---|
| 233,945 | Great Britain | May 21, 1925 |
| 552,779 | Great Britain | Apr. 23, 1943 |